United States Patent
Jung et al.

(10) Patent No.: US 8,774,459 B2
(45) Date of Patent: Jul. 8, 2014

(54) INDOOR USER POSITIONING METHOD USING MOTION RECOGNITION UNIT

(75) Inventors: Hyun-Chul Jung, Seoul (KR); Lee-Kwon Choi, Seoul (KR); Seung-Kwon Lee, Seoul (KR); Nam-Jin Kim, Cheonan-si (KR); Sung-Jun Na, Seoul (KR); Jong-Hwan Bae, Goyang-si (KR); Min-Kyu Kim, Gunpo-si (KR)

(73) Assignee: Mogencelab Corporation, Seoul (KR)

( * ) Notice: Subject to any disclaimer, the term of this patent is extended or adjusted under 35 U.S.C. 154(b) by 212 days.

(21) Appl. No.: 13/442,111

(22) Filed: Apr. 9, 2012

(65) Prior Publication Data

US 2013/0236049 A1    Sep. 12, 2013

(30) Foreign Application Priority Data

Mar. 6, 2012   (KR) .................. 10-2012-0022684

(51) Int. Cl.
*G06K 9/00* (2006.01)
*H04N 9/47* (2006.01)

(52) U.S. Cl.
USPC ............................................ 382/103; 348/94

(58) Field of Classification Search
USPC ........... 382/103, 107, 236; 348/94, 154, 155, 348/169–172, 208.16, 352, 407.1, 700; 386/153

See application file for complete search history.

(56) References Cited

U.S. PATENT DOCUMENTS 8,502,875 B2 *  8/2013  Matsuda et al. ........... 348/207.2
8,560,012 B2 * 10/2013  Ohnishi et al. ............ 455/556.1

FOREIGN PATENT DOCUMENTS

KR    10-2010-0008158 A    1/2010

* cited by examiner

*Primary Examiner* — Abolfazl Tabatabai
(74) *Attorney, Agent, or Firm* — Sherr & Jiang, PLLC

(57) ABSTRACT

An indoor user positioning method including storing user information on a user terminal and user feature information detected from a feature detection device in a central server, detecting the position of the user terminal periodically and storing the detected position in a database, detecting by a motion recognition device attribute information on a user at the front thereof and transmitting the detected attribute information to the central server, extracting user terminals corresponding to the position of the user that the motion recognition device recognizes from the user terminals stored in the database in order to select target users, and comparing the user feature information on the target users stored in the database with the user attribute information that the motion recognition device transmits in order to specify a user at the front of the motion recognition device.

3 Claims, 5 Drawing Sheets

INDOOR USER POSITIONING METHOD USING MOTION RECOGNITION UNIT

CROSS-REFERENCE TO RELATED APPLICATIONS

This U.S. non-provisional patent application claims priority under 35 U.S.C. §119 of Korean Patent Application No. 10-2012-0022684, filed on Mar. 6, 2012, the entire contents of which are hereby incorporated by reference.

BACKGROUND OF THE INVENTION

The present invention disclosed herein relates to an indoor user positioning method using a motion recognition unit for accurately measuring the position of a user by detecting a motion feature of the user in an indoor room having a complex indoor structure such as a large exhibition hall. The present invention has been derived from a research undertaken as a part of the Korea creative contents agency (Project management No.: 211A5020021098901013, period: 2011, Jul. 1~2014, Mar. 31, Project title: evolving interactive exhibition integrated control technology development corresponding to audience response).

Due to the developments of portable terminals and changes of various services using the portable terminals, user customized services using position information on a terminal are increased recently.

Representative techniques for recognizing the positions of the portable terminals may include a method of recognizing the position of a portable terminal equipped with a Global Positioning System (GPS) module and a method of calculating the position of a portable terminal through a triangulation method using a communication signal between the portable terminal and a base station.

However, such a position measuring technique may be effectively applied at an outdoor space having relatively less interference or distortion of GPS signals and communication signals, but may not be available at an indoor space.

To resolve the above limitation at an indoor space, Korean patent publication No. 10-2010-0008158 discloses a technique for calculating the position, of a terminal by using a time difference between a high frequency impulse and a ultrasonic signal, which are transmitted from a plurality of fixed nodes, as shown in FIG. 1.

However, this technique basically uses the same calculation principle as GPS in that a transmission time difference between a plurality of transmission signals is used.

That is, this has the same effect as a GPS transmitter installed at a building itself.

However, such a typical technique may calculate an accurate position only when there is no obstacle between a user and a fixed node in a building Accordingly, if there is an obstacle (such as an auxiliary structure in a building) causing interference or distortion in a communication signal, there are limitation in measuring an accurate position.

SUMMARY OF THE INVENTION

The present invention provides an indoor user positioning method using a motion recognition device for providing user customized contents by calculating the accurate position of a user even at an indoor space being affected largely from interference and distortion of a communication signal.

Embodiments of the present invention provide an indoor user positioning method using a motion recognition device, including: storing user information on a user terminal and user feature information detected from a feature detection device in a central server; detecting by the central server the position of the user terminal periodically and storing the detected position in a database; detecting by the motion recognition device attribute information on a user at the front thereof and transmitting the detected attribute information to the central server; extracting by the central server user terminals corresponding to the position of the user that the motion recognition device recognizes from the user terminals stored in the database in order to select target users; and comparing by the central server the user feature information on the target users stored in the database with the user attribute information that the motion recognition device transmits in order to specify a user at the front of the motion recognition device.

In some embodiments, the user feature information and the user attribute information may include external information regarding a body type of the user.

In other embodiments, the user attribute information may include position information on the user.

In still other embodiments, the feature detection device and the motion recognition device may include a capturing device for capturing an image of a target and a control unit for extracting a feature from the captured image.

In even other embodiments, the detecting of the position of the user terminal may include: performing a communication between a user terminal and a plurality of repeaters; and calculating the position of the user terminal through a triangulation method according to an intensity difference between signals received from each repeater.

In yet other embodiments, the detecting of the position of the user terminal may include: receiving by a user terminal a communication signal from repeaters; transmitting by the user terminal a reply signal in response to the received communication signal to a central server; calculating by the central server a first position of the user terminal by using the reply signal; compensating for by the central server the position of the user terminal by using area information stored in the database; and storing by the central server the calculated position of the user terminal in the database, wherein the repeaters may be divided into a plurality of repeater groups using different communication types and repeaters in each of the plurality of repeater groups may be installed being spaced from each other in order to prevent an overlapping communication area; and the area information may be information on a structure in a target region where a user terminal is positioned.

In further embodiments, the first position calculation is performed using an area where communication areas of repeaters that receive the reply signal overlap.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

Hereinafter, an indoor user positioning method using a motion recognition device will be described according to an embodiment of the present invention with reference to the accompanying drawings.

First, a configuration of an indoor user positioning system using a motion recognition device will be described.

Figure 1:
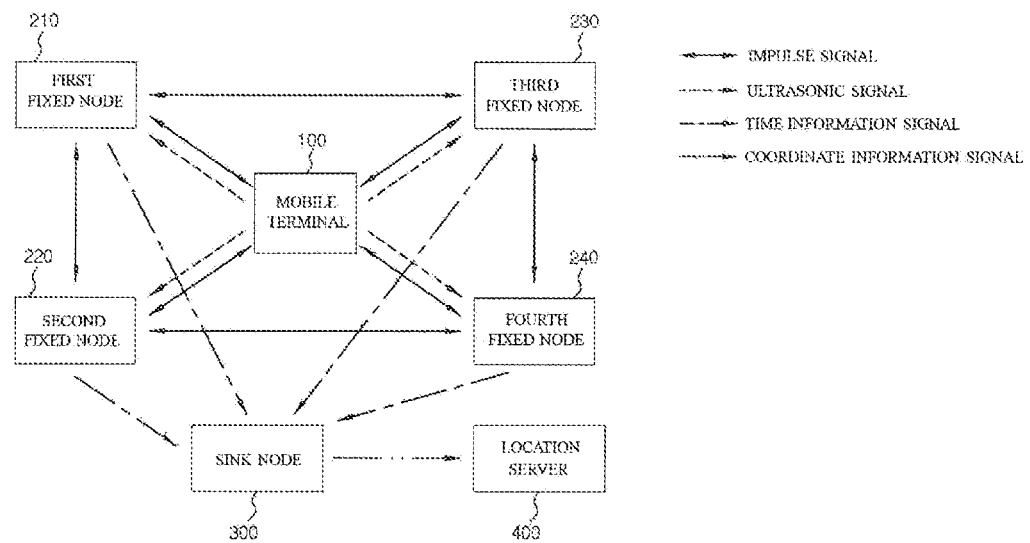
FIG. 1 is a view illustrating a configuration of a typical indoor user positioning system.
Figure 2:
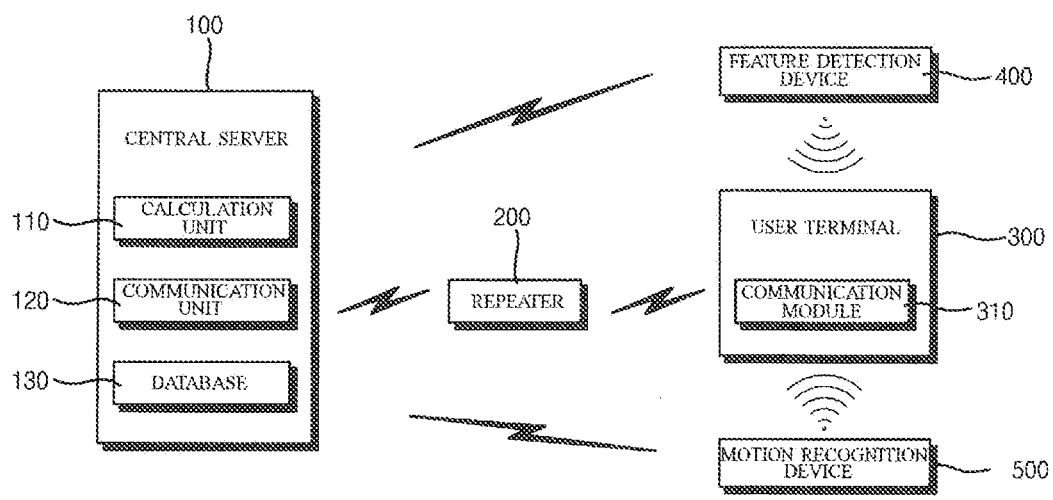
FIG. 2 is a block diagram illustrating a configuration of an indoor user positioning system using a motion recognition device according to an embodiment.

FIG. 2 is a block diagram illustrating a configuration of an indoor user positioning system using a motion recognition device according to an embodiment.

As shown in FIG. 2, the indoor user positioning system includes a central server 100, a repeater 200, a user terminal 300, a feature detection device 400, and a motion recognition device 500.

The motion recognition device 500 as a device for recognizing a motion of an object ahead may be a product for recognizing various kinds of motions. However, according to this embodiment, a device for recognizing a motion is used as one example. The motion recognition device 400 is a device for recognizing a motion of an abject, and basically recognizes a shape of the object in addition to its motion.

The central server 100 includes a communication unit 120 for communicating with the feature detection device 400, the user terminal 300, and the motion recognition device 500, a calculation unit 110 for specifying the corresponding terminal 300 by using inputted user attribute information, and a database 130 for storing the user attribute information and user information detected by the feature detection device 400.

Moreover, the database 130 also stores a terminal position table in which the position of the user terminal 300 is detected and classified.

The user information stored in the database 130 is data, which are based on personal information that a user registers when entering an exhibition hall such as user's age, sex, major, and job.

Additionally, terminal position data stored in the terminal position table are terminal position values updated and stored by the central server 100 periodically. Various embodiments for calculating a position value of a terminal will be described in detail below.

Moreover, the user feature information is extracted by the feature detection device when a user enters an exhibition hall, and then, is transmitted to the central server 100. Moreover, the user feature information includes information for externally identifying a user such as user's height and body type. Hereinafter, a method of extracting the user feature information will be described in detail with reference to FIG. 5.

Moreover, a method of the central server 100 to measure the position of the user terminal 300 will be also described in detail when operations of the present invention are described.

Furthermore, the repeater 200 delivers a communication signal for communicating with the user terminal 300 and includes various kinds of communication repeaters and beacons.

And, a configuration and installation of the repeater 200 will be separately described according to a method of measuring the position of the user terminal 300.

In addition, the user terminal 300 includes a communication module 310 for communicating with the repeater 200.

Moreover, the feature detection device 400 is a device for detecting a motion feature of the user and uses a capturing means for detecting a user feature.

Moreover, the motion recognition device 500 includes an image capturing unit for detecting a shape and motion of an object ahead and a control unit for analyzing the detected shape and motion by using a captured image.

Hereinafter, an indoor user positioning method using a motion recognition device according to an embodiment will be described in detail with reference to the accompanying drawings.

Figure 3:
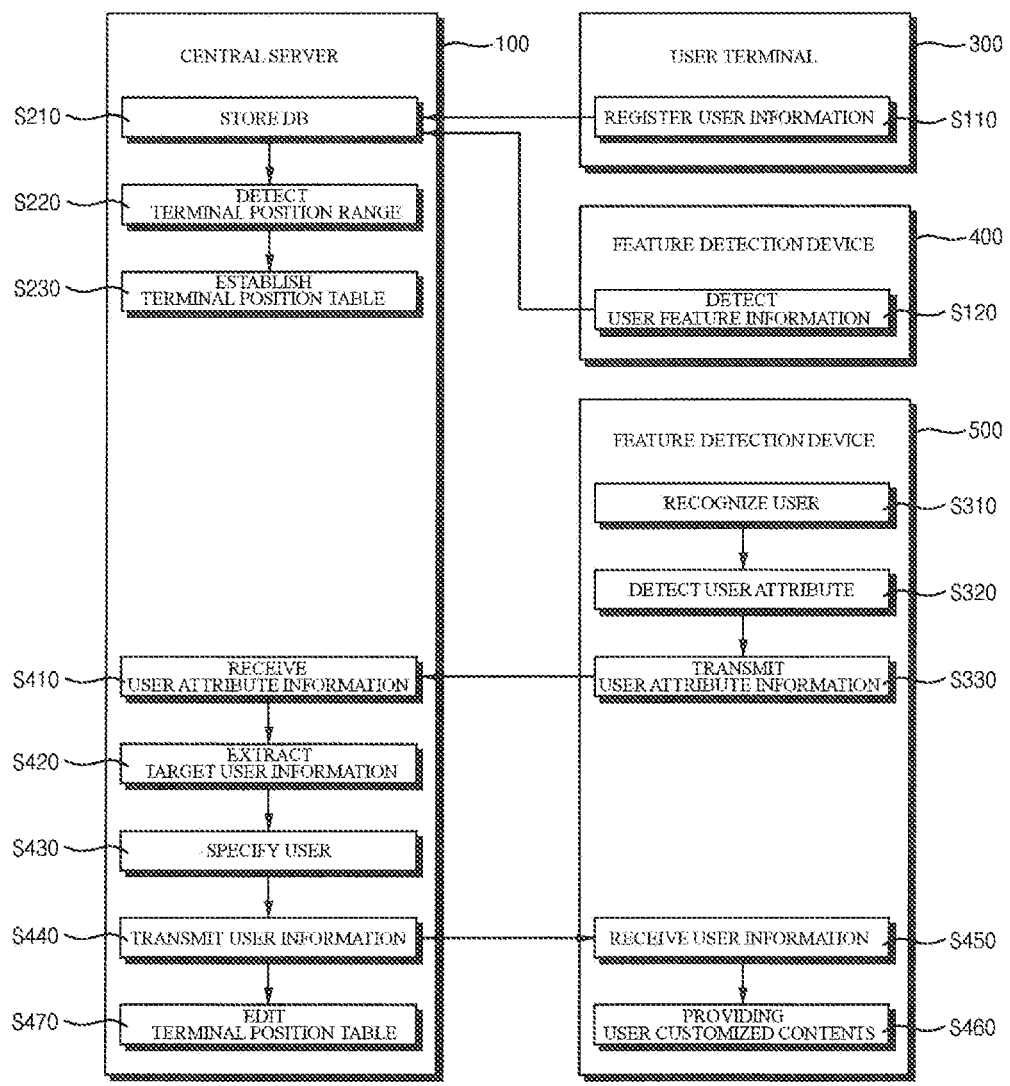
FIG. 3 is a flowchart illustrating an indoor user positioning method using a motion recognition device.
Figure 4:
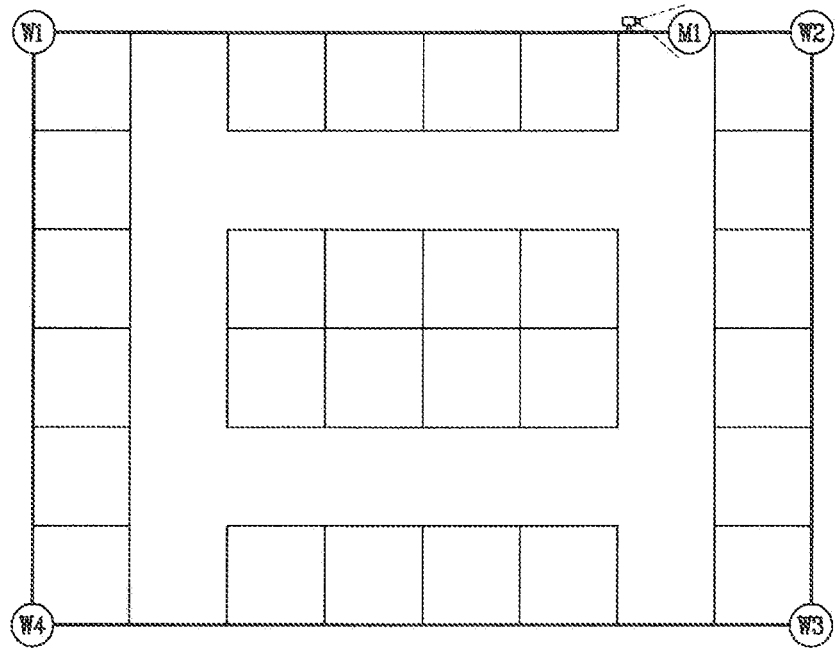
FIG. 4 is a view illustrating an operation for detecting user feature information according to the indoor user positioning method using a motion recognition device.
Figure 5:
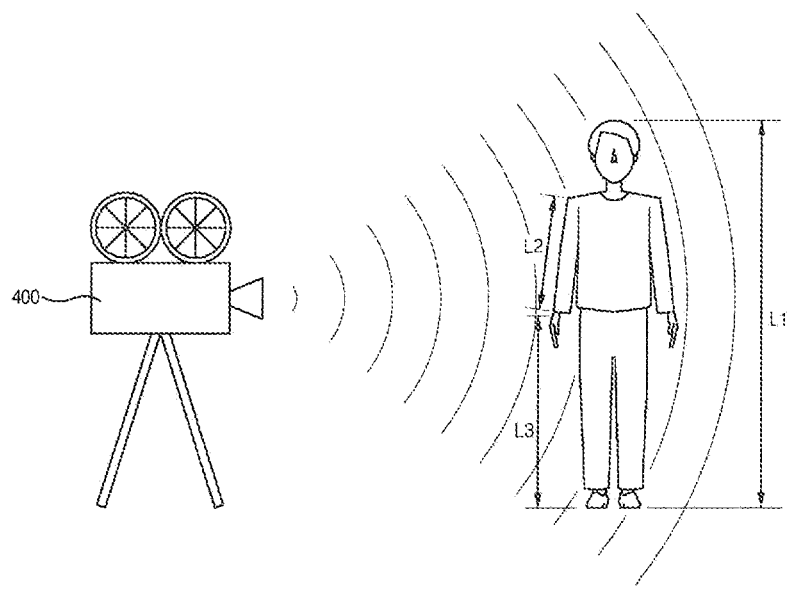
FIG. 5 is a view of when user feature information is detected according to the indoor user positioning method using a motion recognition device.
Figure 6:
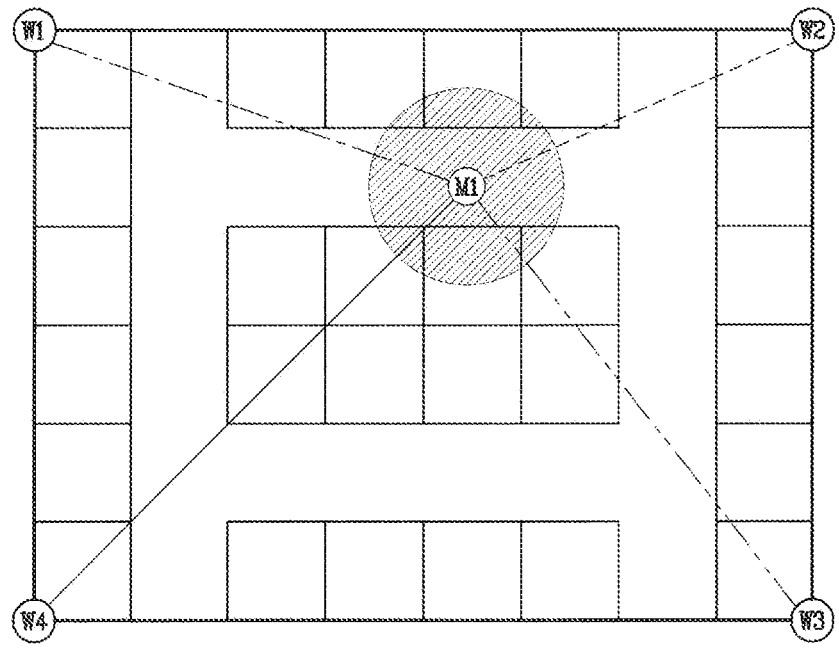
FIG. 6 is a view illustrating an indoor user positioning method using a motion recognition device according to a first embodiment of a first position detecting method.

FIG. 3 is a flowchart illustrating an indoor user positioning method using a motion recognition device. FIG. 4 is a view illustrating an operation for detecting user feature information according to the indoor user positioning method using a motion recognition device. FIG. 5 is a view of when user feature information is detected according to the indoor user positioning method using a motion recognition device. FIG. 6 is a view illustrating an indoor user positioning method using a motion recognition device according to a first embodiment of a first position detecting method. FIG. 7 is a view illustrating an indoor user positioning method using a motion recognition device according to a second embodiment of the first position detecting method. FIG. 8 is a view illustrating an operation for specifying a user according to an indoor user positioning method using a motion recognition device according to an embodiment.

As shown in FIG. 3, according to the indoor user positioning method using a motion recognition device, a user of the user terminal 300 transmits user information to the central server 100 at the beginning in operation S110.

At this point, the user detects user feature information by using the motion recognition device 500 and transmits it to the central server 100 in operation S120.

Then, the central server 100 stores the user information and user feature information in the database 130 in operation S210.

Here, the user information may registered by the user terminal 300 that directly accesses the central server 100, or may be inputted by a manager at a registration booth.

Additionally, when examining that the feature detection device 400 detects user feature information, as shown in FIG. 5, the feature detection device 400 captures a user M1 to generate its feature information when the user M1 enters an exhibition hall. In more detail, as shown in FIG. 5, the feature detection device 400 captures an image of a user, and then, extracts external features such as user's height L1, arm length L2, and leg length L3 from the captured image to generate the user feature information.

Then, as the user terminal 300 moves in the exhibition hall, the central server 100 detects the position of the user terminal 300 periodically in operation S220.

Next, the central server 100 stores the detected position of the user terminal 300 in a terminal position table in operation S230.

A method of the central server 100 to detect the position of a user terminal may vary. Hereinafter, various embodiments regarding a method of detecting the position of a user terminal will be described.

Embodiment 1

As shown in FIG. 7, as a user terminal communicates with a plurality of repeaters W1 to W4, the position of the user terminal may be calculated through a triangulation method according to an intensity difference between signals transmitted from each of the repeater W1 to W4.

At this point, the position of the user terminal M1 may be identified within an error tolerance range r1.

Embodiment 2

Figure 7A:
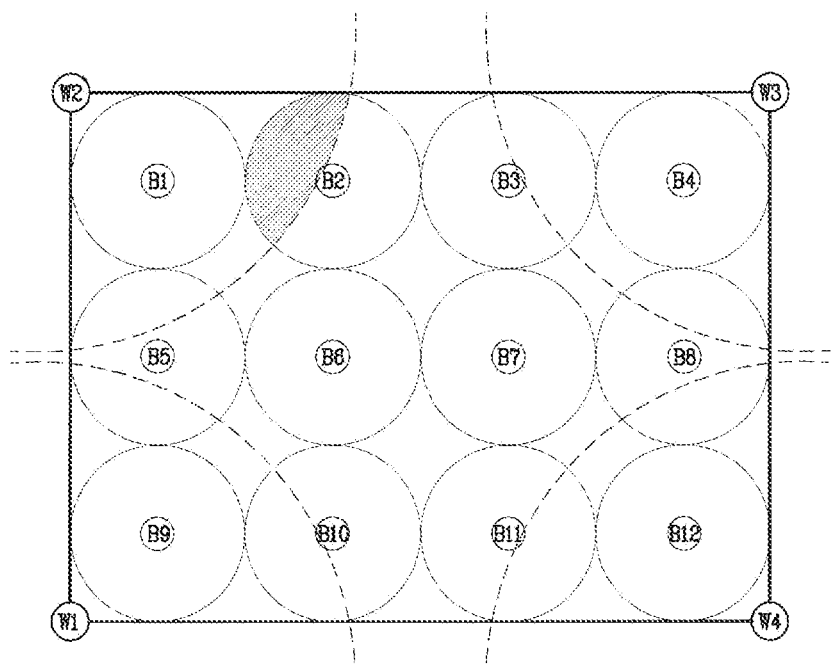
FIG. 7 is a view illustrating an indoor user positioning method using a motion recognition device according to a second embodiment of the first position detecting method.
Figure 8:
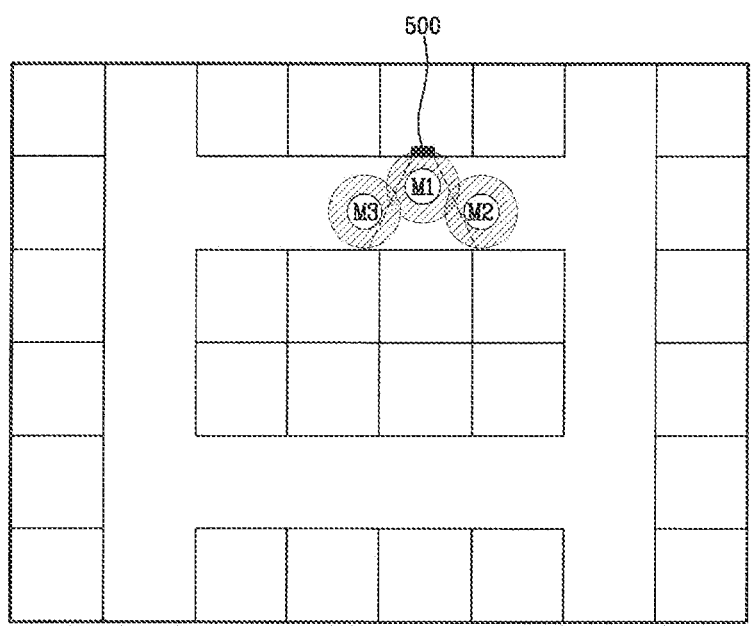
FIG. 8 is a view illustrating an operation for specifying a user according to an indoor user positioning method using a motion recognition device according to an embodiment.

As shown in FIG. 7A, a plurality of communication repeaters W1 to W4 and B1 to B12 are installed at the exhibition hall. The communication repeaters include at least two repeaters, and include at least one repeater having a different communication type. That is, there are repeater groups W1 to W4 using a first communication type and repeater groups B1 to B12 using a second communication type, each including at least one repeater.

Then, a repeater in each repeater group is installed to prevent an overlapping communication area. That is, each repeater using the same communication type is installed being spaced from each other in order to prevent an overlapping communication area.

Moreover, the central server 100 receives a communication state of a user terminal through a repeater in order to calculate the position of the user terminal, and compensates for the calculated position of the user terminal by using area information.

At this point, the area information refers to information regarding a structure in a target area where the position of the user terminal is measured.

That is, the user terminal 300 receives a communication signal from a repeater, and transmits a reply signal in response to the received communication signal.

The central server 100, which receives the replay signal, calculates a first position of the user terminal by using the reply signal. The first position is calculated using an installation position and communication area of a repeater that receives the reply signal. That is, when the position of the user terminal is calculated using the communication signal, the received signal is used but its reception strength and reception time are not considered.

Figure 7B:
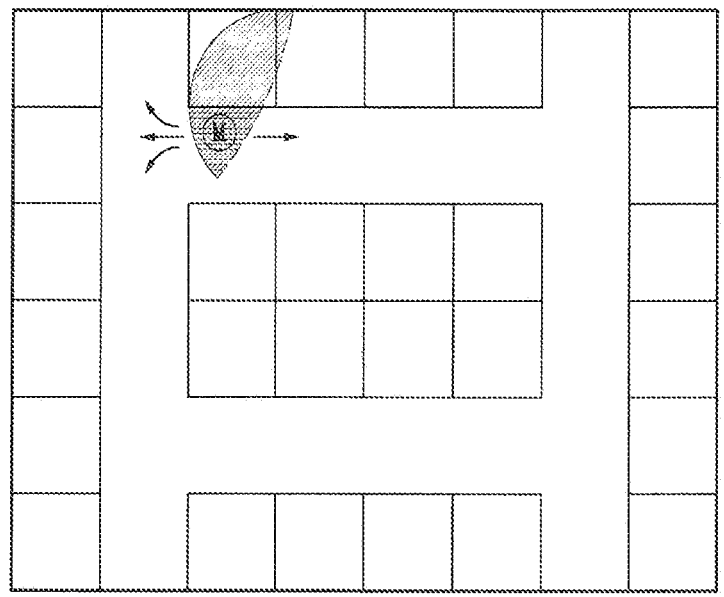

Then, as shown in FIG. 7B, the central server 100 performs a layout compensation in order to compensate for the position of the user terminal 300 by using the area information. The layout compensation is to compensate for the position of the user terminal 300, being limited thereto, excluding an area where a structure is positioned in the position area of the first position calculated user terminal.

Then, the motion recognition device 500 installed at a specific exhibition booth recognizes a user ahead in operation S310.

The motion recognition device 500 recognizes the user and detects an attribute of the user in operation S320.

Here, a user attribute refers to user's shape (height, body type, and so on), and furthermore, includes accurate position information on the user. The user position information refers to the accurate position of the user, which is calculated using the fixed position of the motion recognition device 500 and the distance between and direction of the user and the motion recognition device 500.

Furthermore, the user attribute information is transmitted to the central server 100, and the central server 100 extracts target user information from the received user attribute information in operations S330, S410, and S420.

Here, the target user refers to user information on terminals corresponding to the position information on a user included in the user attribute information that the motion recognition device 500 transmits within an error tolerance range, in the positions of the terminals stored in the terminal position table.

That is, as shown in FIG. 8, the target user refer to users of the terminals M1, M2, and M3 that may correspond to the position of a user that the motion recognition device 500 recognizes, in the positions of the terminals stored in the terminal position table.

Then, the central server 100 compares the user attribute transmitted from the motion recognition device 500 with the user feature information on the target users stored in the database 130, to specify a user having the highest similarity among the target users in operation S430.

Once a user at the front of the motion recognition device 500 is specified in operation S430, user information regarding the specified user is transmitted to the motion recognition device 500 in operation S450.

Of course, at this point, the transmitted user information is used for providing a corresponding user customized content. If the motion recognition device 500 is linked with a display unit, the user information may be transmitted to the motion recognition device 500. If not, the user information may be directly transmitted to the display unit.

Moreover, if there is a difference between the position of the terminal stored in the terminal position table and the corresponding position of the specified user, the central server 100 updates the position information regarding the terminal stored in the terminal table with the position of the user that the motion recognition device 500 detects, and then, stores the updated information in operation S470.

According to an indoor user positioning method using a motion recognition device according to the present invention, the following effects may be expected.

That is, according to the present invention, attribute information on a corresponding visitor is received through position recognition at each booth, and through this, customized contents are provided to the corresponding visitor.

According to the present invention, provided is an indoor user positioning method using a motion recognition unit for accurately measuring the position of a user by detecting a motion feature of the user in an indoor room having a complex indoor structure such as a large exhibition hall. Therefore, attribute information on a corresponding visitor may be received through user position recognition at each booth, and through this, customized contents may be provided to the corresponding visitor.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An indoor user positioning method using a motion recognition device, comprising:
    storing user information on a user terminal and user feature information detected from a feature detection device in a central server;
    detecting by the central server the position of the user terminal periodically and storing the detected position in a database;
    detecting by the motion recognition device attribute information on a user at the front thereof and transmitting the detected attribute information to the central server;
    extracting by the central server user terminals corresponding to the position of the user that the motion recognition device recognizes from the user terminals stored in the database in order to select target users; and
    comparing by the central server the user feature information on the target users stored in the database with the user attribute information that the motion recognition device transmits in order to specify a user at the front of the motion recognition device,
    wherein the user feature information and the user attribute information comprise external information regarding a body type of the user,
    wherein the user attribute information comprises position information on the user,
    wherein the feature detection device and the motion recognition device comprise a capturing device for capturing an image of a target and a control unit for extracting a feature from the captured image,
    wherein the detecting of the position of the user terminal comprises:
    receiving by a user terminal a communication signal from repeaters;
    transmitting by the user terminal a reply signal in response to the received communication signal to a central server;
    calculating by the central server a first position of the user terminal by using the reply signal;
    compensating for by the central server the position of the user terminal by using area information stored in the database; and
    storing by the central server the calculated position of the user terminal in the database,
    wherein the repeaters are divided into a plurality of repeater groups using different communication types and repeaters in each of the plurality of repeater groups are installed being spaced from each other in order to prevent an overlapping communication area; and
    the area information is information on a structure in a target region where a user terminal is positioned.

2. The method of claim 1, wherein the detecting of the position of the user terminal comprises:
    performing a communication between a user terminal and a plurality of repeaters; and
    calculating the position of the user terminal through a triangulation method according to an intensity difference between signals received from each repeater.

3. The method of claim 1, wherein the first position calculation is performed using an area where communication areas of repeaters that receive the reply signal overlap.

* * * * *